United States Patent [19]

Salvia

[11] 4,022,159

[45] May 10, 1977

[54] SHIPPING CAGE FOR FEEDING ANIMALS WATER FROM DISPOSABLE BAGS

[76] Inventor: Matthew Salvia, Coldspring Road, Standfordville, N.Y. 12581

[22] Filed: Nov. 17, 1975

[21] Appl. No.: 632,626

Related U.S. Application Data

[63] Continuation-in-part of Ser. No. 517,509, Oct. 24, 1974, Pat. No. 3,958,535.

[52] U.S. Cl. .................................. 119/19; 119/72.5
[51] Int. Cl.² .......................................... A01K 7/00
[58] Field of Search ...................... 119/72.5, 19, 71

[56] References Cited

UNITED STATES PATENTS

| | | | |
|---|---|---|---|
| 2,708,421 | 5/1955 | Jauch | 119/71 |
| 3,228,377 | 1/1966 | Grassano | 119/72.5 |
| 3,645,234 | 2/1972 | Schroer | 119/72.5 |
| 3,703,159 | 11/1972 | Rose-Miller | 119/19 |

Primary Examiner—Hugh R. Chamblee

[57] ABSTRACT

A receptacle, either integral with or attachable to an animal cage, for retaining a disposable bag of sterile water, having a demand feeding valve with a piercing point at the end opposite the feeding portion upon which the bag may be impaled. The apparatus is adapted for either feeding animals in laboratories or during shipping.

6 Claims, 16 Drawing Figures

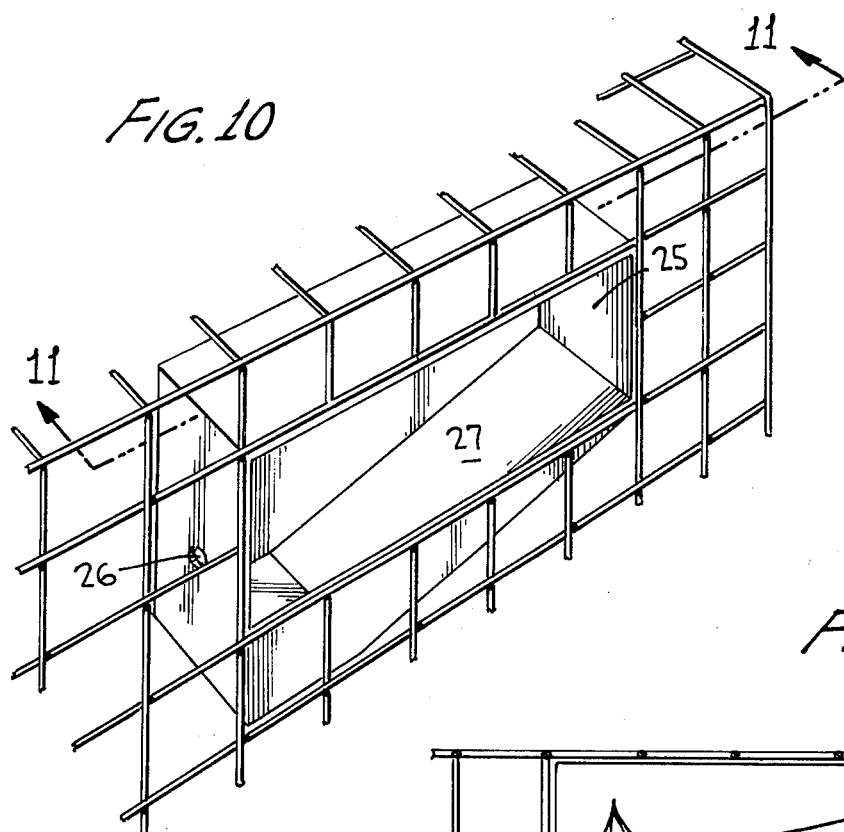
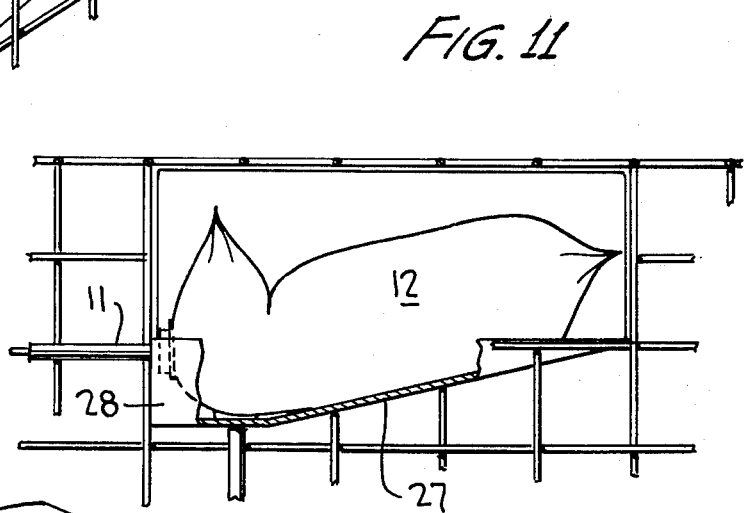
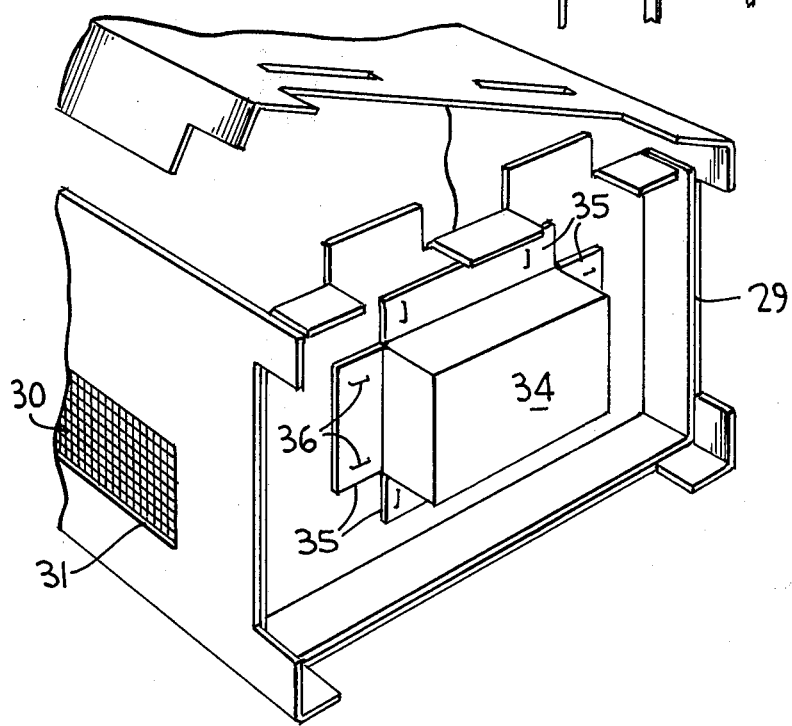

4,022,159

SHIPPING CAGE FOR FEEDING ANIMALS WATER FROM DISPOSABLE BAGS

This is a continuation-in-part of U.S. application Ser. No. 517,509, filed Oct. 24, 1974, now U.S. Pat. No. 3,958,535.

BACKGROUND OF THE INVENTION

In controlled scientific experiments using small animals such as rodents, research laboratories have many thousands of cages in which the animals are housed. Essential in the care of such animals is the availability of water at all times. Any harmful bacteria either in the water or at the feeding mechanism could induce sickness in the rodent which, during research experiment, could invalidate the experiment. In the prior art, to achieve sterility, the presently used water bottles and feeding tubes are sanitized and refilled two (2) or three (3) times weekly. This involves removing the bottles from the cage rooms, sanitizing the bottles and component parts, filling the bottles with water and transporting them back to the cage rooms.

Accordingly it is the primary object of this invention to provide a receptacle used in conjuction with an animal cage to retain a disposable bag of sterile water and protect it from the claws of the animals which may feed such water from a demand valve.

Another object of this invention is to provide a demand feeding valve with a piercing point upon which to impale a disposable bag of sterile water while it is retained in a protective receptacle.

A still further object of this invention is to maintain a constant sterility in the water feeding of laboratory animals.

BRIEF DESCRIPTION OF THE DRAWINGS

These and other objects and advantages of the invention will subsequently become apparent from the following detailed description and discussion of the prior art when read in conjunction with the accompanying drawings wherein:

FIG. 10 is a view of another form of receptacle integral with the side wall of an animal cage;

FIG. 11 is a view of the receptacle with bag in feeding position taken along line 11 — 11 of FIG. 10;

FIG. 12 is a view of a standard shipping container for animals with another form of receptacle secured to an end wall;

DETAILED DESCRIPTION OF THE INVENTION AND DRAWINGS

Figure 1:
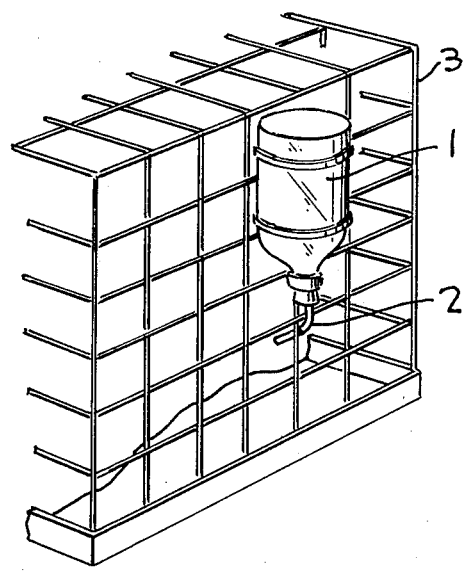
FIG. 1 is a view of an animal cage with a watering bottle used in the prior art.

Referring now more specifically to the drawings, FIG. 1 shows a prior art system of feeding water to laboratory animals by means of a glass bottle 1 having a stainless steel sipper feeding tube 2. The bottle is secured to the outside of a cage 3 with the tube entering the cage as shown. Generally, the cages may contain ten (10) or more rodents. The bottles are changed an average of two and one-half (2.5) times a week. Since as previously noted, many thousands of cages are involved, a considerable investment in equipment and time is needed to service the animals with fresh water. The bottles are collected in racks, placed on conveyors and passed through a heated washing system and ultimately refilled with tap water at a filling manifold. The bottles are subject to breakage and must be replaced. Aside from the costliness of this procedure, the tap water used may contain harmful bacteria. In the preferred and intended use of this invention, disposable plastic bags are filled with bacteria-free spring water.

Figure 2:
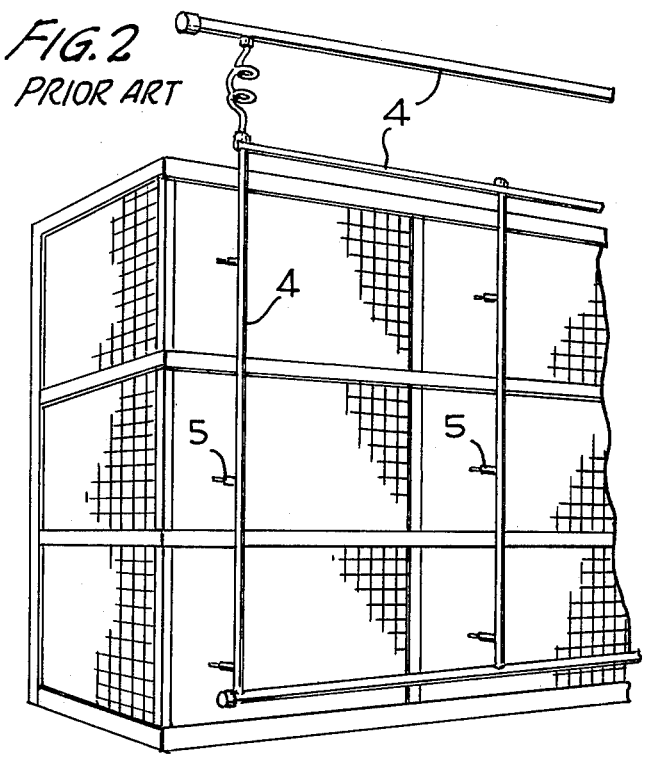
FIG. 2 is a view of animal cages and a fixed piping and feeding valve system of the prior art.

FIG. 2 shows another prior art system for watering animals in which a permanent system of piping 4 is installed having spring loaded lever valves 5 extended into each cage. The disadvantages of this system are that, as before, when untreated water is used, the valves from prolonged usage may become contaminated with bacteria. If a valve should become clogged, the animal could become dehydrated in a short period of time from lack of water before the defect in the valve would become known.

Figure 3:
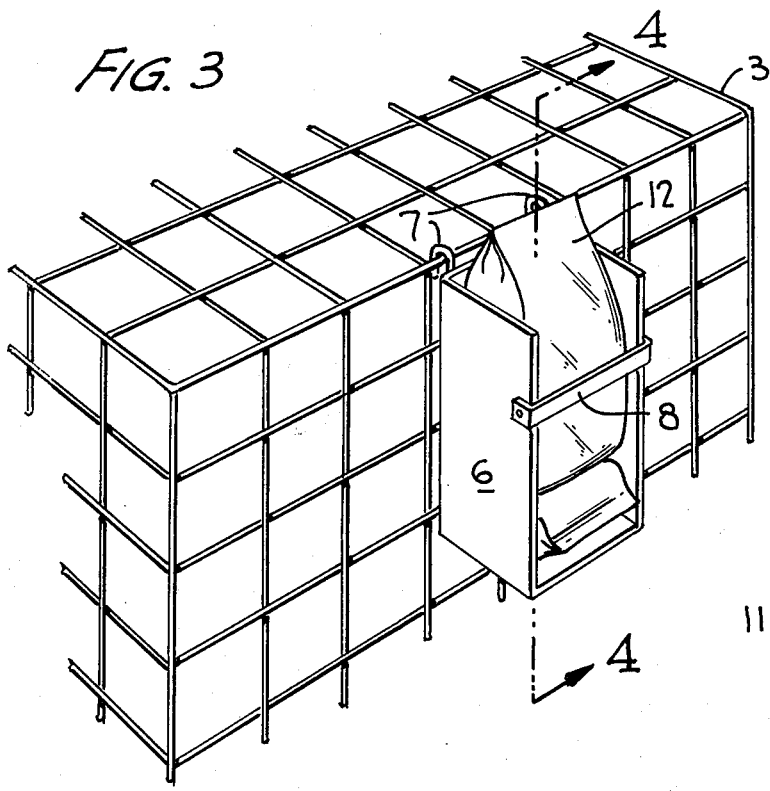
FIG. 3 is a view of one form of the receptacle and bag of the invention on an animal cage.
Figure 4:
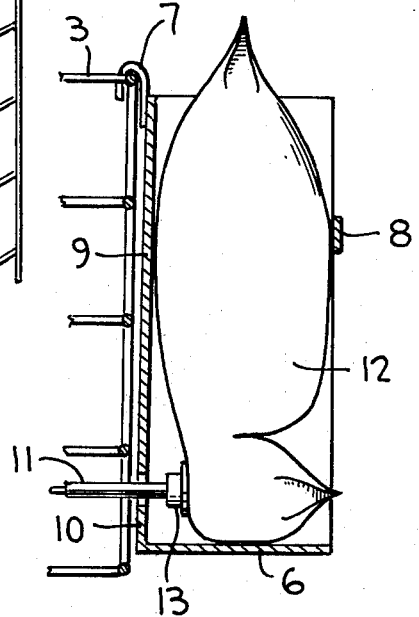
FIG. 4 is a view of the receptacle bag and feeding valve taken along line 4 — 4 of FIG. 3.
Figure 5:
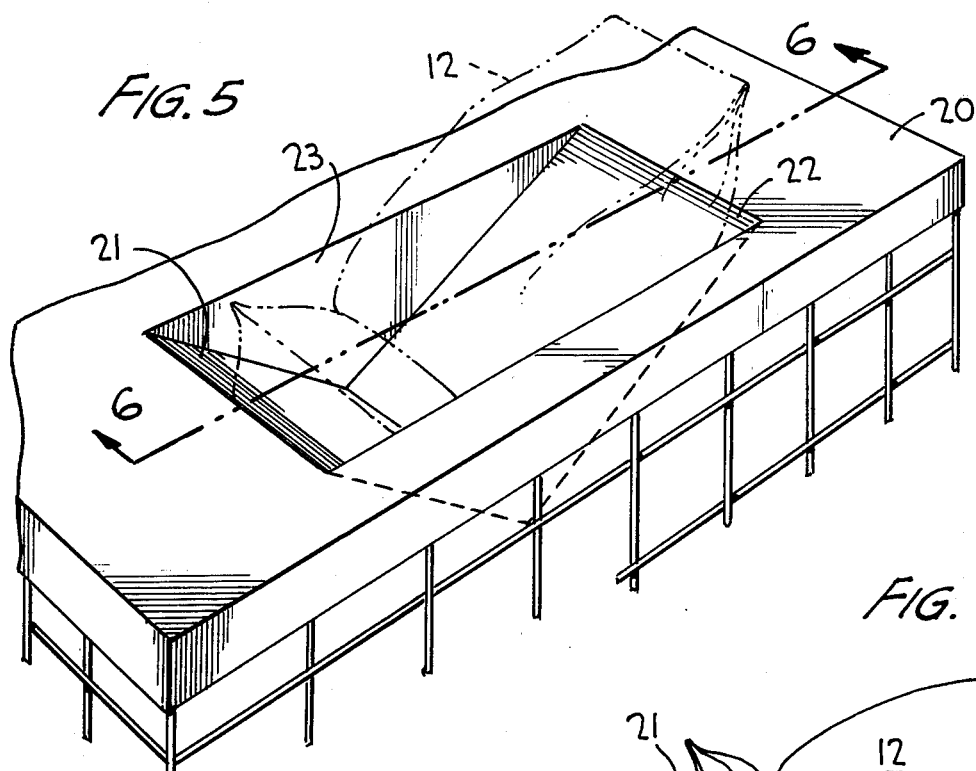
FIG. 5 is a view of another form of receptacle integral in the top of an animal cage.

Turning now to the present invention, FIGS. 3 and 4 show a receptacle 6 preferably made of metal, having hooks 7 for attaching it to the bars of cage 3. The receptacle as shown is open on two (2) sides for economy and has a restraining strap 8. On the wall portion 9 facing the cage there is an opening 10 through which a demand feeding valve 11 is introduced into the cage.

Figure 8:
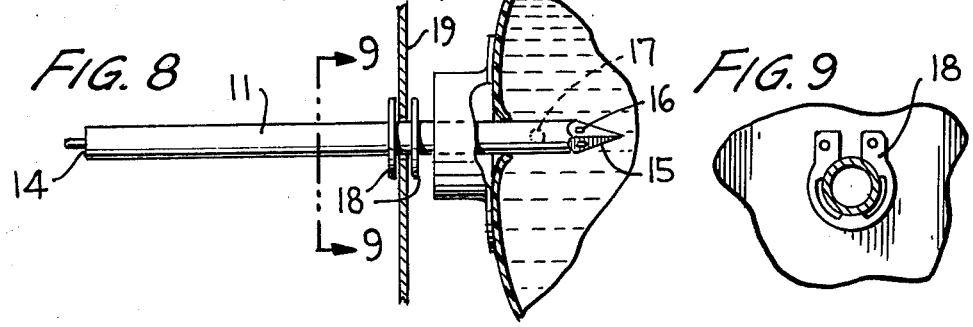
FIG. 8 is an enlarged view of the feeding valve in operative position.

Bag 12 made of heat-sealable plastic has a plastic fitment 13 located on one (1) face of the bag as described in the afore-mentioned patent application, Ser. No. 517,509. The demand feeding valve 11 as shown in FIG. 8 has a feeding portion 14 with a spring loaded feeding tip. The details are not shown since it is common in the prior art as exemplified by U.S. Pat. No. 3,228,377. The other end of the tubular valve 11 has a piercing point with holes 16 and is shown in the pierced position to allow water in the bag to flow to the feeding portion. Alternatively, a hole could be located in the wall of the tube as at 17. In a simplified construction, the piercing point may be made of plastic and secured in the tubular end of valve 11.

Figure 9:
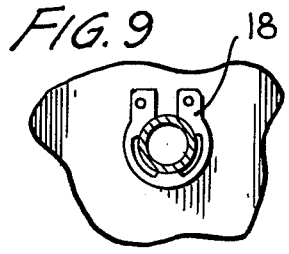
FIG. 9 is a view of a retaining clip taken along line 9 — 9 of FIG. 8.

To prevent the feeding valve from being moved by the animals, u-shaped resilient retaining clips 18 as shown in FIGS. 8 and 9 may be positioned on the valve tube 11 on opposite sides of the wall of a receptacle through which the valve passes in the manner shown with respect to a disc 19 to be used in a later modification. Although now shown, it is desirable to use such clips in the modifications of FIGS. 4, 5, 7 and 10.

Figure 6:
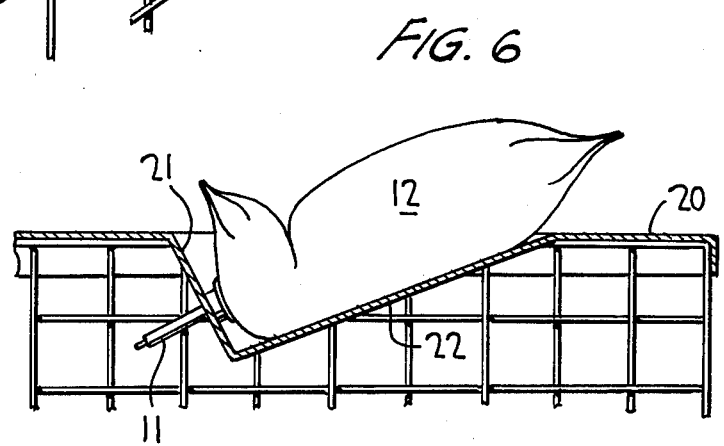
FIG. 6 is a view of the receptacle, bag and feeding valve taken along line 6 — 6 of FIG. 5.

Some of the larger animals may prefer to drink by actuating a valve depending from the top of a cage as shown in FIG. 6. For this purpose a cage top 20 made of metal has an integral receptacle consisting of inclined surfaces 21, 22 and side walls 23. Inclined surface 21 has a hole through which valve 11 projects.

Figure 7:
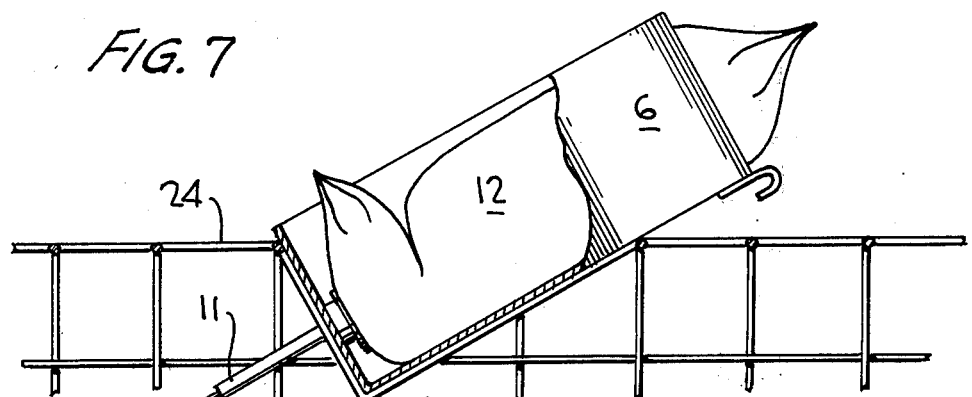
FIG. 7 is a view of the receptacle of FIG. 3 used with another form of top for an animal cage.

To economize on metal usage, a bar cage 24 can be modified to have similarly shaped recess in its top as shown in FIG. 7. A receptacle 6 with a hole in its bottom wall rather than the side wall as in FIG. 4 could then be used to protect the bag during feeding.

For small animals feeding from lower areas in the cage, an alternative to the modification of FIG. 3 is an integral sheet metal receptacle 25 welded interiorly to the bars of the cage as shown in FIGS. 10 and 11. The receptacle has a hole 26 to receive the feeding valve and an inclined surface 27 to facilitate the flow of water. The receptacle is open on one (1) side to insert the bag and may have further shielding as indicated at 28.

Related to the problem of feeding animals in laboratories, is the one involving the feeding of water to such animals while they are being shipped from breeders to the laboratories where as indicated previously, prior art procedures depend on the animals eating enough pieces of raw vegetables, fruits or moisturized paste foods to obtain sufficient liquid to survive during the time of travel.

A standard form of shipping cage 29 made from corrugated paper is shown in FIG. 12. It is sold as precut, scored blanks which are assembled and secured with staples by the breeder. Screening 20 is also stapled internally to cover various breathing openings such as 31. Scorings are also provided for holes 32 which may be punched out of the end surface 33 as in FIG. 15. Thus a feeding valve with a metal disc 19 secured thereto as in FIG. 8 may be introduced into the cage through such hole, a bag of water impaled on the piercing point and then enclosed with a corrugated paper receptacle 34 having flaps 35 which are secured by staples 36 to the end surface of the shipping cage.

Figure 13:
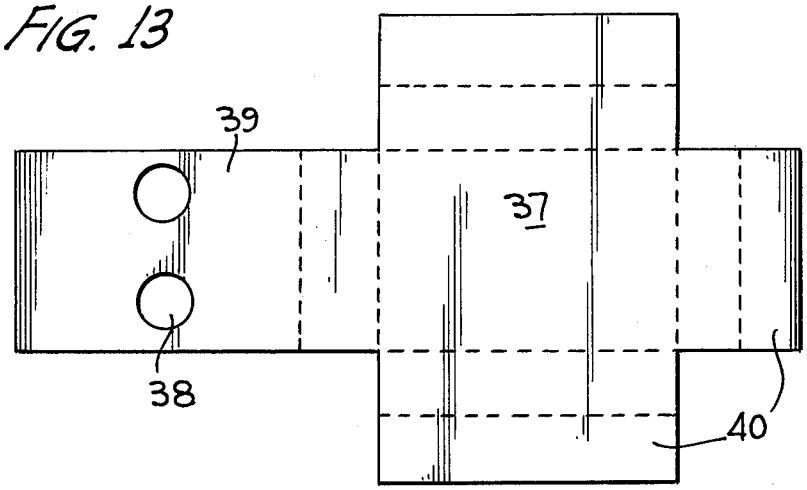
FIG. 13 is a plan view of a receptacle blank for use with a shipping container.
Figure 14:
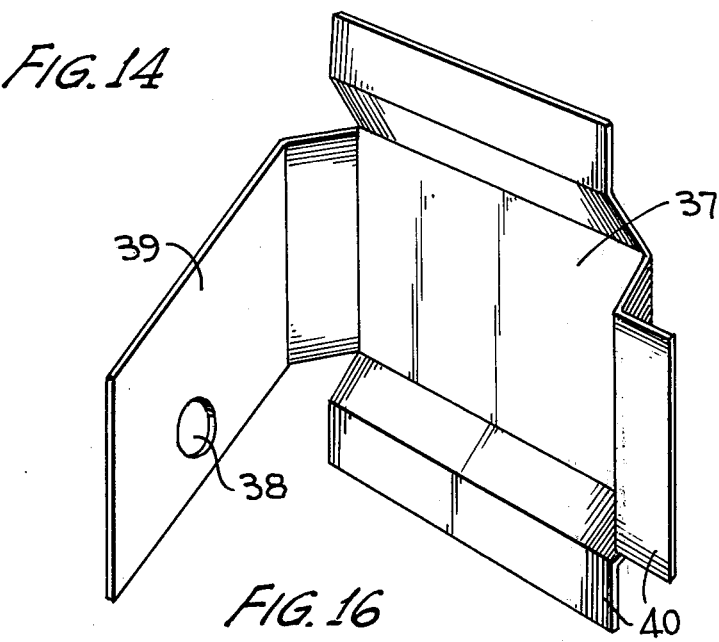
FIG. 14 is a view of a partially erected receptacle blank.
Figure 15:
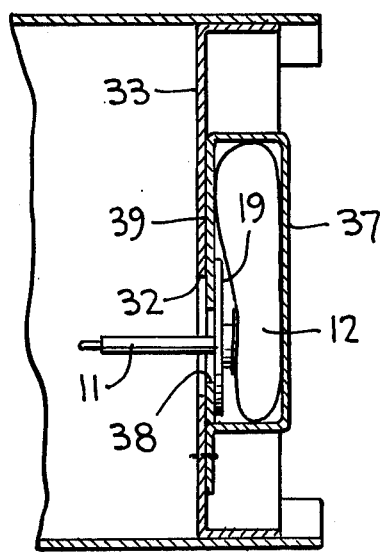
FIG. 15 is a sectional view of the receptacle of FIG. 14 secured with bag and feeding valve to the outside wall of a shipping container.
Figure 16:
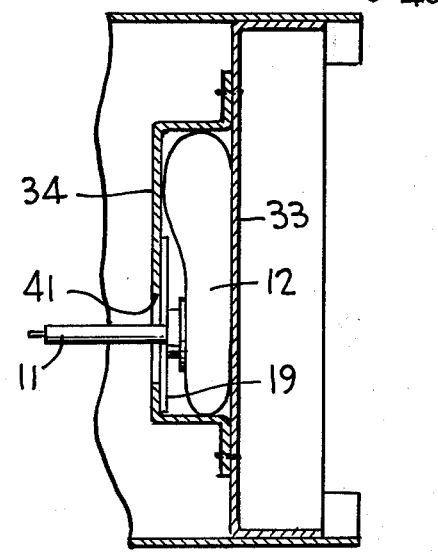
FIG. 16 is a similar view of the receptacle secured inside a shipping container.

Another form of a corrugated paper receptacle 37 is shown in FIGS. 13 through 15. The receptacle has one or more holes 38 in a closure panel 39 and three (3) securing flaps 40. The receptacle enclosing the water bag 12, feeding valve 11 and disc 19 is shown secured to the outside surface of the shipping cage. Optionally, the receptacle 34 in FIG. 12 may have a hole 41 formed in it, enclose a water bag and be secured on the inside of the shipping cage as shown in FIG. 16.

The advantages of the invention are apparent from the foregoing description. In feeding animals in research laboratories, there will be an assured supply of bacteria-free water with an economy in time and equipment in replenishing the water supply. In shipping animals, there will be a significant improvement over prior art procedures by the provision of a positive supply of water, never present before. While various changes may be made in the details of construction, it is understood that such changes will be within the spirit and scope of the present invention.

I claim:

1. A shipping cage for feeding animals liquids while in transport comprising a bottom, side walls and a cover,
    receptacle means secured to the exterior of one of said side walls,
    a sealed plastic container of liquid within said receptacle means,
    a feeding means extending through an opening in said exterior wall and having a demand feeding valve at one end and a piercing point at the other end impaled within said container,
    and means to prevent withdrawal of the feeding means by an animal including a disc and resilient clamping means engaging said feeding means.

2. A shipping cage as defining in claim 1 wherein the cage is made of corrugated paper and the receptacle means has flaps to secure it to the cage.

3. A shipping cage as defined in claim 1 wherein the container is a bag containing sterile water.

4. A shipping cage for feeding animals liquids while in transport comprising, a bottom, side walls and cover,
    receptacle means secured to the interior of one of said side walls,
    a sealed plastic container of liquid within said receptacle means,
    a feeding means extending through an opening in said receptacle means and having a demand feeding valve at one end and a piercing point at the other end impaled within said container,
    and means to prevent withdrawal of the feeding means by an animal including a disc and resilient clamping means engaging said feeding means.

5. A shipping cage as defined in claim 5 wherein the cage is made of corrugated paper and the receptacle means has flaps to secure it to the cage.

6. A shipping cage as defined in claim 2 wherein the container is a bag containing sterile water.

* * * * *